(12) United States Patent
Dodds (10) Patent No.: US 9,162,335 B2
(45) Date of Patent: Oct. 20, 2015

(54) AUTO CHANGER SPINDLE MOUNTING ASSEMBLY

(75) Inventor: Kemma Samuel Dodds, North Lauderdale, FL (US)

(73) Assignee: Air Turbine Technology, Inc., Boca Raton, FL (US)

( * ) Notice: Subject to any disclaimer, the term of this patent is extended or adjusted under 35 U.S.C. 154(b) by 945 days.

(21) Appl. No.: 13/355,096

(22) Filed: Jan. 20, 2012

(65) Prior Publication Data

US 2013/0190153 A1 Jul. 25, 2013

(51) Int. Cl.
*B23Q 3/157* (2006.01)
*B23Q 5/06* (2006.01)
*B23C 9/00* (2006.01)
*B23Q 1/00* (2006.01)
*B23Q 5/04* (2006.01)

(52) U.S. Cl.
CPC ................ *B23Q 3/157* (2013.01); *B23C 9/005* (2013.01); *B23Q 1/0036* (2013.01); *B23Q 5/048* (2013.01); *B23Q 3/1574* (2013.01); *B23Q 2220/008* (2013.01); *Y10T 409/309296* (2015.01); *Y10T 483/1736* (2015.01); *Y10T 483/1738* (2015.01)

(58) Field of Classification Search
CPC ............... Y10T 483/1738; Y10T 409/309296; Y10T 409/30448; Y10T 409/303976; Y10T 409/304032; Y10T 408/44; Y10T 408/45; Y10T 408/453; Y10T 408/455; Y10T 279/17111; B23C 9/005; B23Q 5/048
USPC .................... 483/32; 409/230, 144, 135–136; 408/56–59; 279/20
See application file for complete search history.

(56) References Cited

U.S. PATENT DOCUMENTS 1,281,420 A * 10/1918 Wells .............................. 408/59
2,552,463 A *  5/1951 Searles ........................... 408/56

(Continued)

FOREIGN PATENT DOCUMENTS

DE        3447932        9/1985
FR        2662104 A1 *  11/1991

(Continued)

OTHER PUBLICATIONS

International Search Report and Written Opinion dated Apr. 11, 2013 for International Application No. PCT/US2013/022173.

(Continued)

*Primary Examiner* — Erica E Cadugan
(74) *Attorney, Agent, or Firm* — Fleit Gibbons Gutman Bongini & Bianco PL; Jon A. Gibbons (57) ABSTRACT

An apparatus and method for machining is provided. A mounting assembly for use with a spindle, a CNC machine, an auto changer device and an air supply line, can include a mounting collar and a mounting block. The mounting collar can have a collar body and a collar arm, where the collar body defines a collar opening and one or more grooves circumscribing the collar opening, where the one or more grooves each have a sealing element positioned therein, and wherein the collar arm has a collar inlet, a collar outlet and a collar channel to provide fluid communication between the collar inlet and the collar outlet. The mounting block can be connected to the CNC machine and can have a block inlet connected to the air supply line, a block outlet, and a block channel to provide fluid communication between the block inlet and the block outlet.

11 Claims, 10 Drawing Sheets

(56) References Cited

U.S. PATENT DOCUMENTS

| | | | |
|---|---|---|---|
| 3,561,299 A * | 2/1971 | Brisk et al. | 408/59 |
| 4,620,824 A * | 11/1986 | Eckstein et al. | 409/233 |
| 5,601,386 A * | 2/1997 | Wells | 408/57 |
| 7,360,976 B2 * | 4/2008 | Bryan | 409/230 |
| 7,568,867 B2 * | 8/2009 | Bryan | 409/230 |
| 8,992,137 B2 * | 3/2015 | Gregory et al. | 408/57 |
| 2004/0146368 A1 | 7/2004 | Konishi | |
| 2009/0060673 A1 | 3/2009 | Mace | |
| 2014/0018219 A1 * | 1/2014 | Dodds | 483/19 |

FOREIGN PATENT DOCUMENTS

| | | | |
|---|---|---|---|
| GB | 2166374 | | 5/1986 |
| JP | 2002-018663 A | * | 1/2002 |
| JP | 2002-052434 A | * | 2/2002 |
| WO | 2009029822 | | 3/2009 |

OTHER PUBLICATIONS

European Search Report dated Feb. 4, 2015, received for European Patent Application No. 13738057.2.

International Preliminary Report on Patentability dated Jul. 22, 2014 received for PCT Application No. PCT/US2013/022173.

* cited by examiner

AUTO CHANGER SPINDLE MOUNTING ASSEMBLY

FIELD OF THE INVENTION

This disclosure relates generally to machining processes and more specifically to an apparatus and method for machining.

BACKGROUND

Computer Numerical Control (CNC) machines are utilized in machining processes, and utilize a computer controller that typically reads G-code instructions for driving a powered mechanical device that is typically used to fabricate metal components by the selective removal of metal. CNC can do numerically directed interpolation of a cutting tool in the work envelope of a machine.

The powered mechanical device is often a pneumatic tool (e.g., a drill) that is fitted for coupling with the CNC machine, such as by insertion into and withdrawal from a CNC machine. The pneumatic tools or spindles can be manually coupled with the CNC machine or an automatic tool changer can be utilized.

Some tools are available from a CNC tool magazine, but require that the machine be stopped after change-over so that suitable power connections can be established with the tool. Other tools are pre-connected to the pneumatic source, but must be manually engaged with the CNC machine. Thus, CNC machines are typically programmed to stop prior to the normal machining cycle to permit manual tool installation or creation of a suitable power link with the tool after coupling with the machine.

Accordingly, there is a need for an apparatus and method for machining that facilitates the tool exchanging process. There is a further need for such an apparatus and method that provides flexibility to use various types of tools.

SUMMARY

An apparatus and method for machining is provided. The features of the examples described herein can allow for machining while facilitating the tool exchanging process. These features can also provide flexibility to use various types of tools with the CNC machine or other control device.

In one example of the present disclosure, a spindle mounting assembly for use with a CNC machine, an auto changer device and a gas or air supply line, can include an auto changer spindle mounting assembly. The spindle mounting assembly can have a collar body and a collar arm, where the collar body has a first side and a second side and the collar body defines a collar opening. The collar opening creates a passage between the first side and the second side of the collar body. The spindle mounting assembly can also have a collar sleeve with a first end formed with an outer diameter sized to be larger than the collar opening. The second end of the tubular collar sleeve formed with an outer diameter sized to fit through the collar opening with a portion of the second end of the tubular collar sleeve protruding from the second side of the collar opening. Further, the spindle mounting assembly can also have a lock ring formed with an inner diameter sized to fit around the second end of the tubular sleeve protruding from the second side of the collar opening. The lock ring may include one or more fasteners for holding the lock ring to the second end of the tubular collar sleeve protruding from the second side of the collar opening.

The spindle mounting assembly can be connected to the CNC machine and can have a block inlet connected to the air supply line, a block outlet, and a block channel to provide fluid communication between the block inlet and the block outlet. The collar body further defines a passage in fluid communication between the gas inlet and the circular collar opening. The spindle mounting assembly may include a check value to allow air to pass into the inlet above a given pressure.

The spindle is selectively positioned through the collar opening and connected to the mounting collar, where the collar outlet is selectively in fluid communication with the spindle and sealed by the sealing element, where the collar inlet is selectively placed in fluid communication with the block outlet by the auto changer device. The spindle can be selectively rotated in the collar opening.

In another example, the collar opening in the collar body may include a side wall with one or more grooves formed thereon. The lock ring includes at a least a first seal sized to fit between the first end of the tubular collar sleeve and at least a second seal sized to fit between the second end of the tubular collar sleeve and the lock ring.

The above-described and other features and advantages of the present disclosure will be appreciated and understood by those skilled in the art from the following detailed description, drawings, and appended claims.

BRIEF DESCRIPTION OF THE DRAWINGS

The FIG. 1 is perspective view of an exemplary machining system according to an embodiment of the present invention.

DETAILED DESCRIPTION OF THE INVENTION

Figure 1:
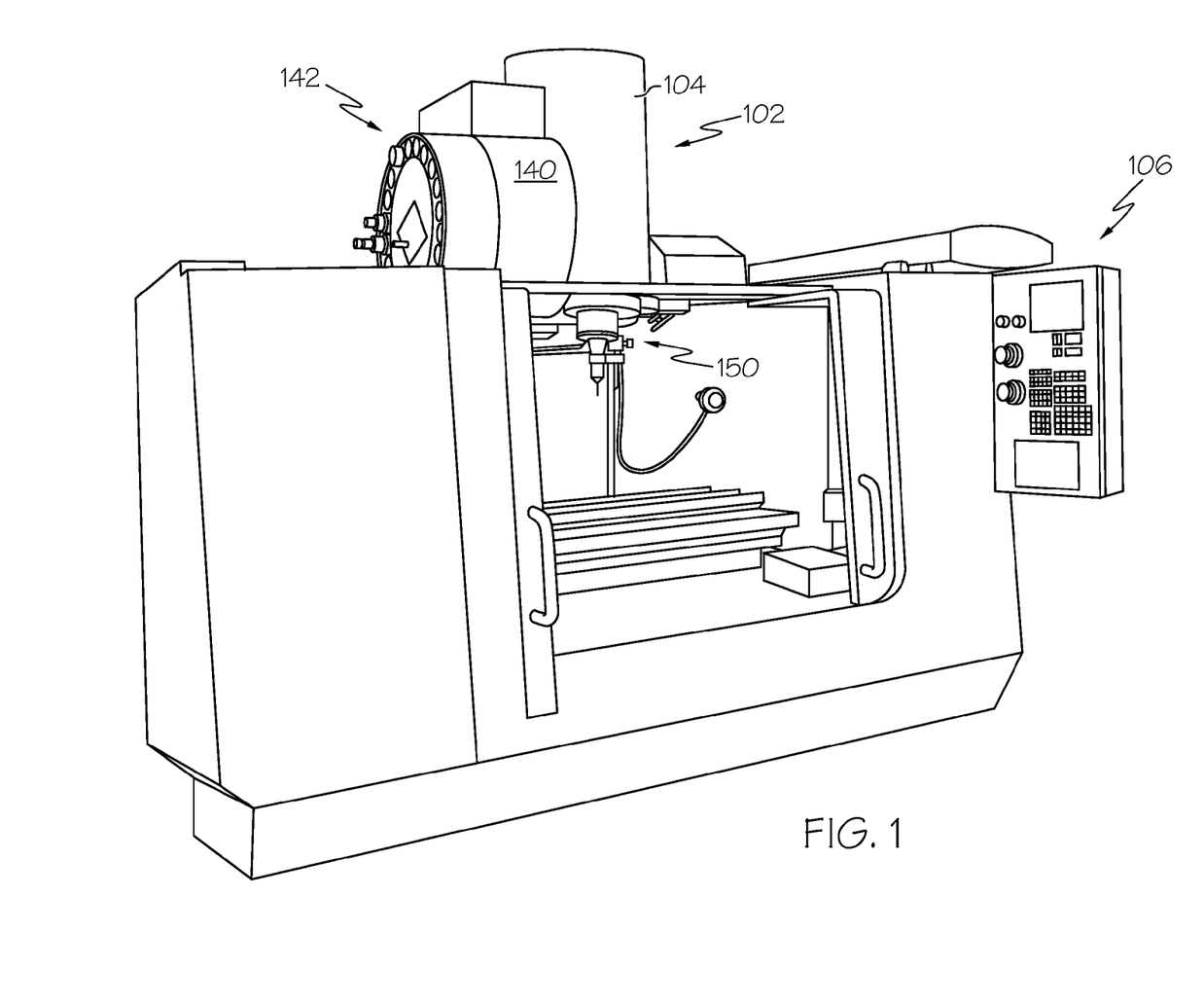
Figure 2:
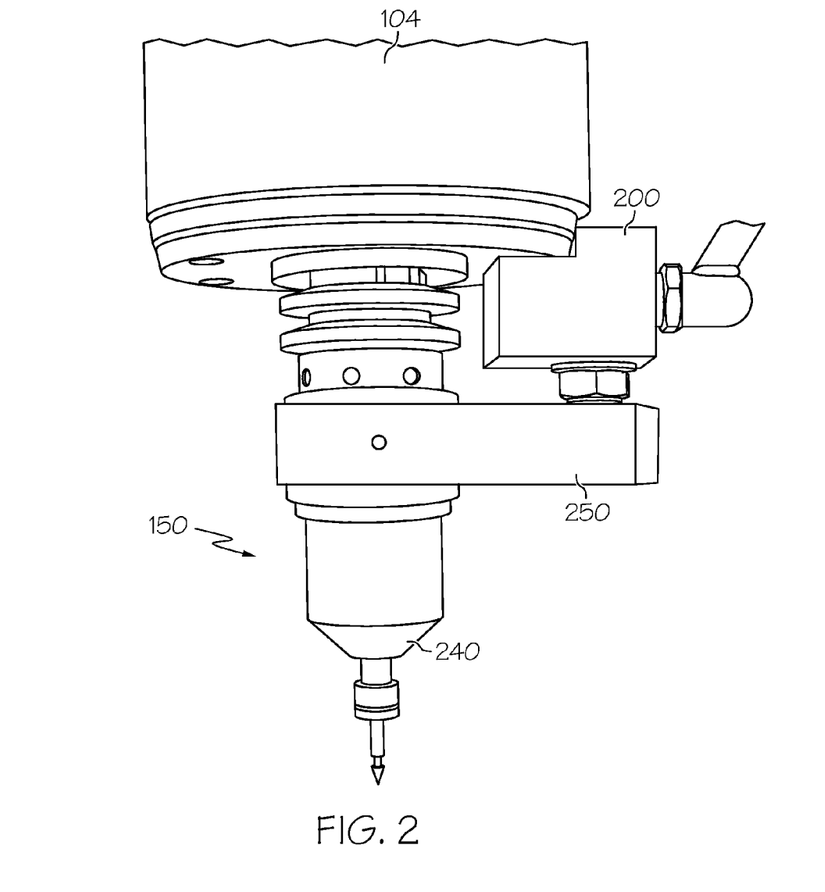
FIG. 2 is a perspective view of another portion of the system of FIG. 1.

Referring to the drawings, and in particular to FIGS. 1-2, a machining system is shown and generally represented by reference numeral 102. System 102 can include a control device 104, such as a CNC machine, a tool carousel 140, and one or more tools or spindles 142. The control device 104 can include a user input device 106 for inputting commands. The control device 104 can utilize various computational hardware and software to implement a machining process on a work piece, and the present disclosure is not intended to be limited based upon the type of control utilized.

The system 102 can also have a universal spindle mounting assembly (USMA) 150 that cooperates with the spindles 142 to allow for automatic exchanging of the spindles with the CNC machine 104. In the exemplary embodiment of system 102, the spindles 142 are exchanged between the CNC machine 104 and the tool carousel 140 by way of an auto changer device 800 (shown in FIGS. 8-9), which will be explained later in greater detail. However, the present disclosure contemplates the use of other structures and techniques for connecting and disconnecting the spindles 142 with the CNC machine 104 through use of the USMA 150, such as a linear carousel.

The USMA 150 can include a mounting collar assembly 250 and a mounting block 200, as shown more clearly in FIG. 2. The mounting collar assembly 250 can be operably coupled to the spindle 240, while the mounting block 200 can be operably coupled to the CNC machine 104.

Figure 3:
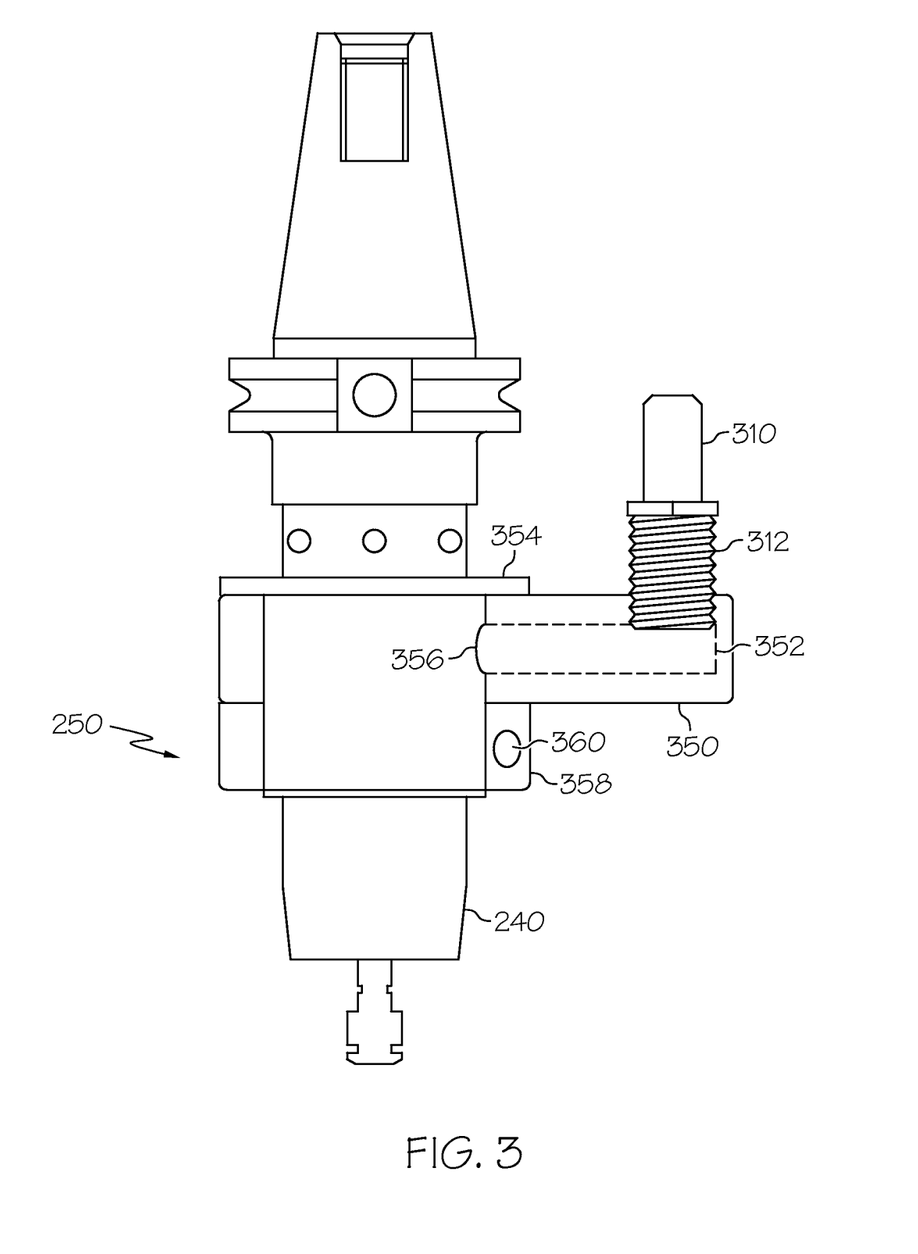
FIG. 3 is a side view of a spindle and mounting collar assembly of the system of FIG. 1.
Figure 4:
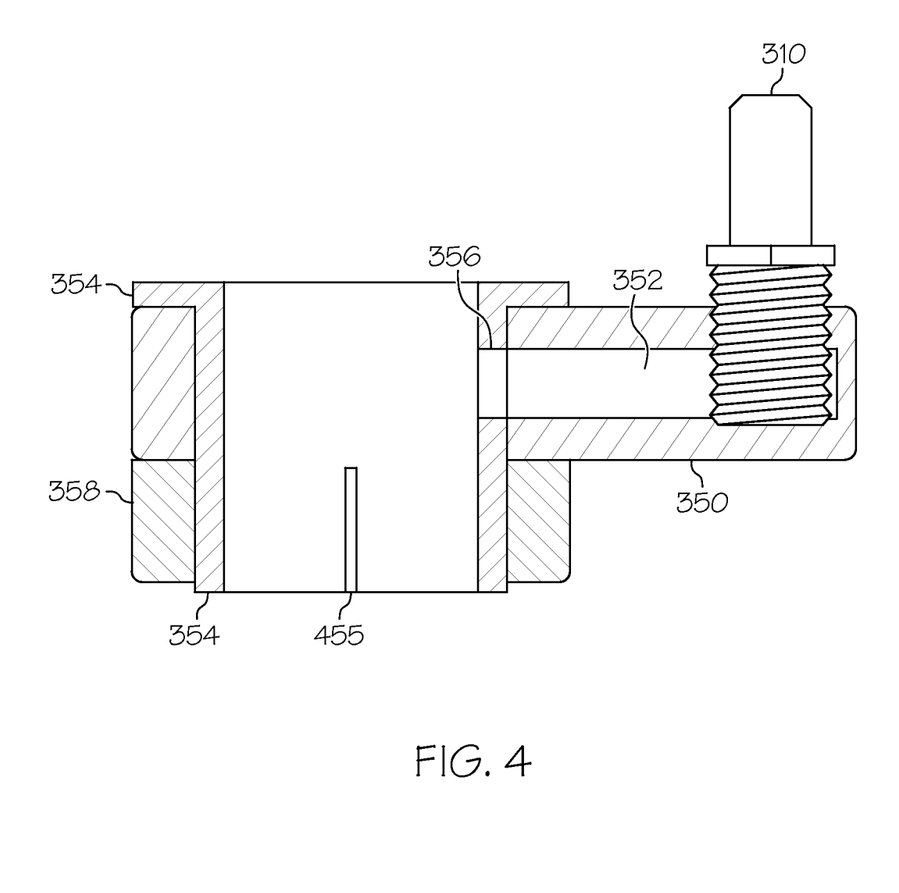
FIG. 4 is a side view of the mounting collar assembly of the system of FIG. 3.
Figure 5:
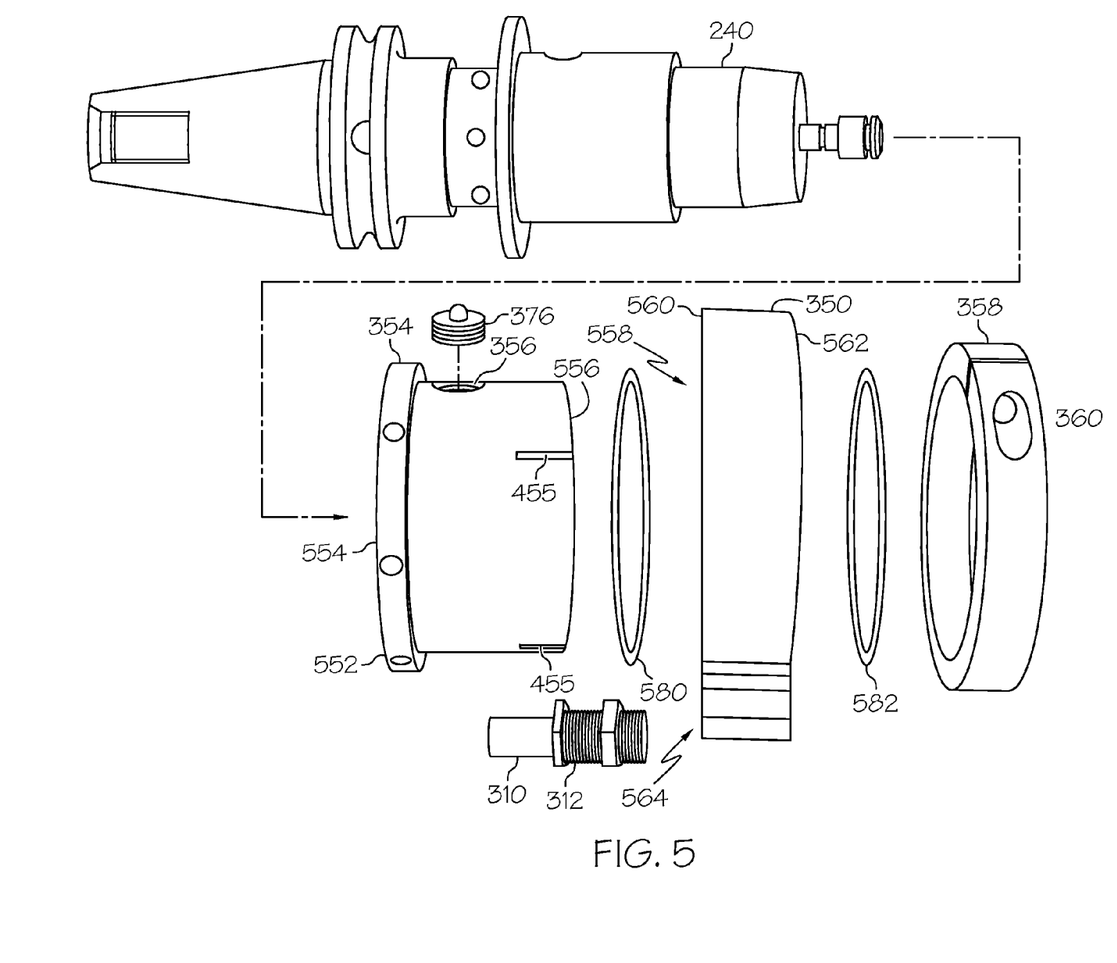
FIG. 5 is a side explosion view of the mounting collar and tubular collar sleeve of FIG. 4.
Figure 6:
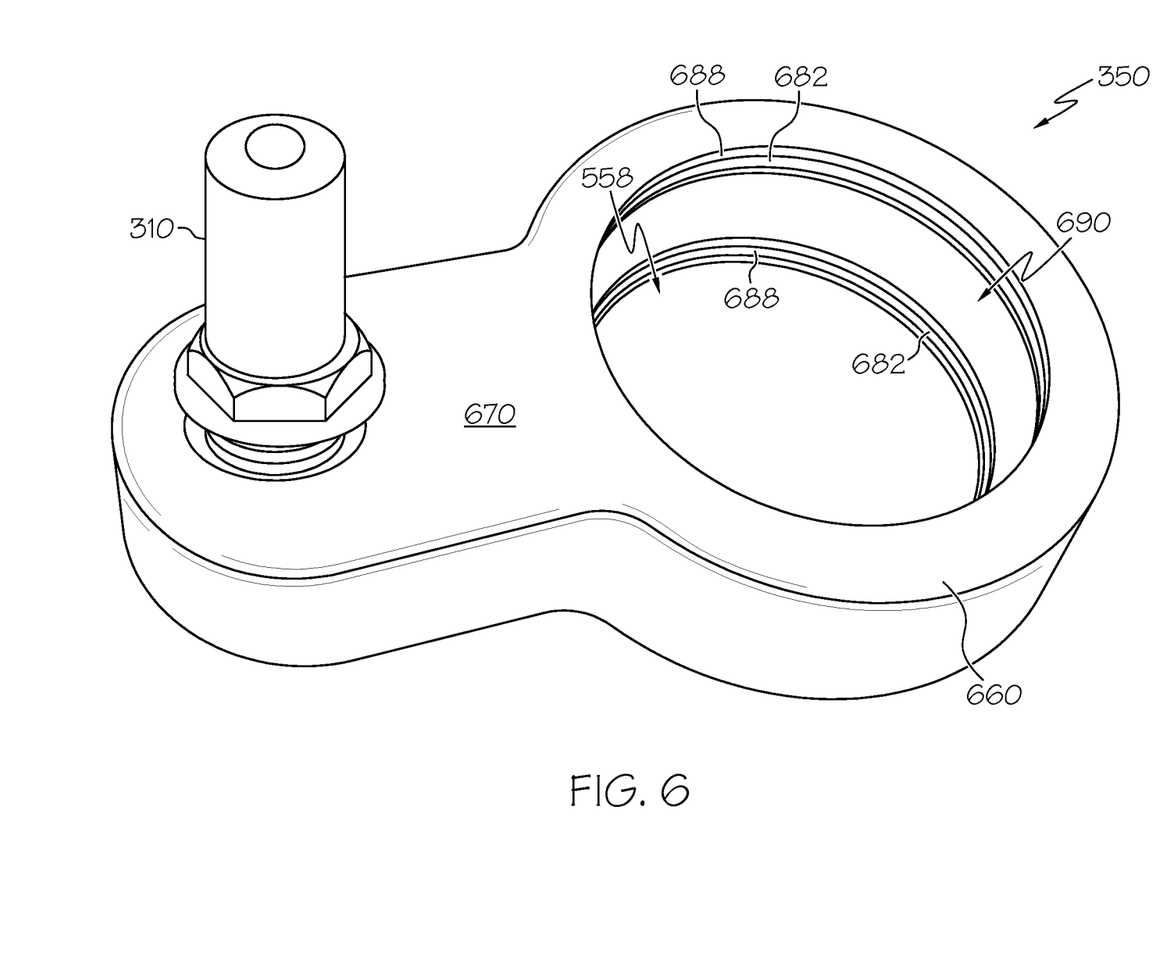
FIG. 6 is another perspective view of the mounting collar of FIG. 5.

More specifically, FIG. 3 illustrates the novel mounting assembly 250 with mounting collar 350 attached to the spindle 240. Mounting collar 350 includes a collar sleeve 354 and lock ring 358. With reference to FIGS. 4-6, shown is a collar opening 558 is formed through the body 660 of the mounting collar 350. The collar opening 558 is sized to accept a portion 556 of the tubular collar sleeve 354 therethrough. More specifically, one end 552 of the collar sleeve 354 is formed as a ring 554 with a larger diameter to be larger than the other end 556 of the collar sleeve 354. The other end 556 of the collar sleeve 354 is formed to fit through the collar opening 556 and to protrude from a second end 562 of the collar opening 558.

A lock ring 358 is sized to form over the second end 556 of the collar sleeve 354. A fastening member 360, such as a screw, secures the lock ring 358 to the collar sleeve 354. In another example, the second end 556 of the collar sleeve 354 has threads (not shown) formed on the outside surface. Likewise, the lock ring 358 contains corresponding threads to hold the lock ring 358 to the collar sleeve 354.

The collar sleeve 354 may include an opening 356. In one example, threads are formed on the walls of opening 356 to accept a threaded plug 376. The threaded plug firmly holds the spindle 240 inside collar sleeve 354.

The mounting collar 350 includes a passage 352 in fluid communication between an air inlet assembly 310 and the collar opening 356. The air inlet assembly 310 has a threaded end 312 for inserting into the mounting collar 350. In one example, air inlet assembly 310 includes a spring-loaded check valve that opens above a given pressure to allow liquid, such as air, to flow into the air inlet assembly 310. The use of a check-valve greatly reduces any dirt and undesirable debris from entering the air inlet assembly 310. This is especially important when the mounting collar 350 and spindle 240 are stored in the tool carousel and/or not being used.

The spindle 240 is secured in inside collar 354 with a threaded plug 376 inserted into opening 356. One or more slots 455 are formed in the collar sleeve 354. The slots allow the second end 556 of the collar sleeve 354 to be compressed into a smaller diameter by lock ring 358.

Also a set of O-rings 580, 582 are used to seal the pressurize air or fluid inside mounting collar. In one example, pressurized fluid delivered through the collar 350 is used to operate the spindle 240. The O-rings 580 may be made out of Teflon, rubber, or other suitable material.

Figure 7A:
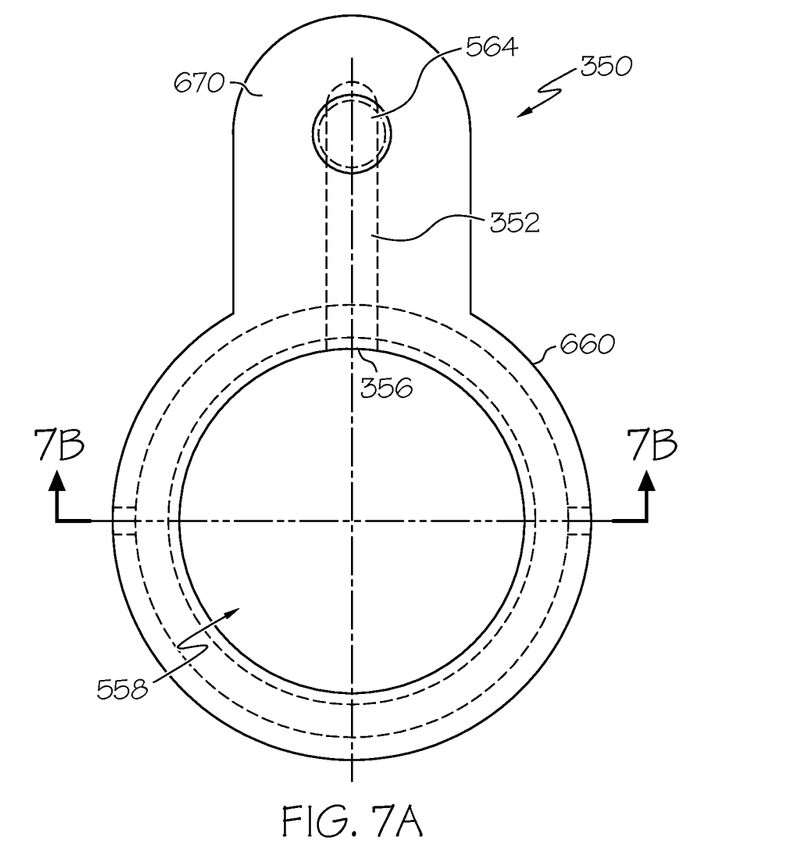
FIG. 7 is a plan and cross-sectional view of the mounting collar of FIG. 5.
Figure 7B:
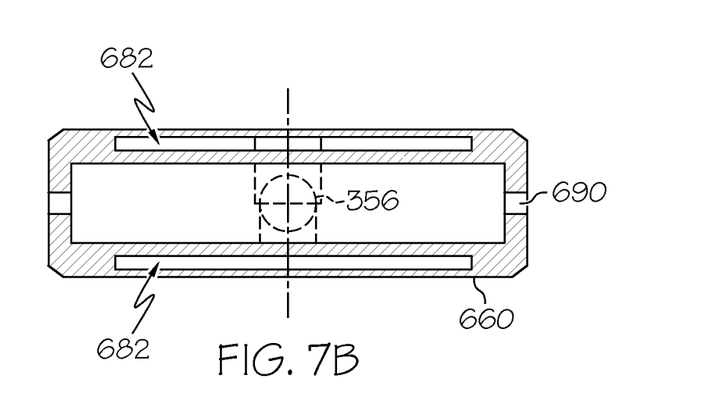

Referring additionally to FIGS. 6-7, the mounting collar 350 can have a generally circular shaped body 660 defining a mounting or collar opening 558 therethrough. The mounting collar 350 can have a collar arm 670 extending from the circular body 660. The collar arm 670 can have an arm supply channel or passage 352 (as shown in FIG. 3), an arm supply opening or inlet 564 (as shown in FIG. 5), and an air inlet assembly 310 that acts as a quick connect device in communication with each other in order to deliver air from the quick connect device to the opening 558 in mounting collar 350.

The opening 558 can be defined in part (e.g., circumscribed) by a pair of grooves 682 in the collar body 660 that have O-rings 688 or other sealing structure positioned therein. The grooves 682 and O-rings 688 can define a collar supply channel 690 therebetween. Various materials can be used for the O-ring 688, including rubber. Other shapes and sizes for the mounting collar 350 can also be used. In one example, the O-rings are sized.

Figure 8:
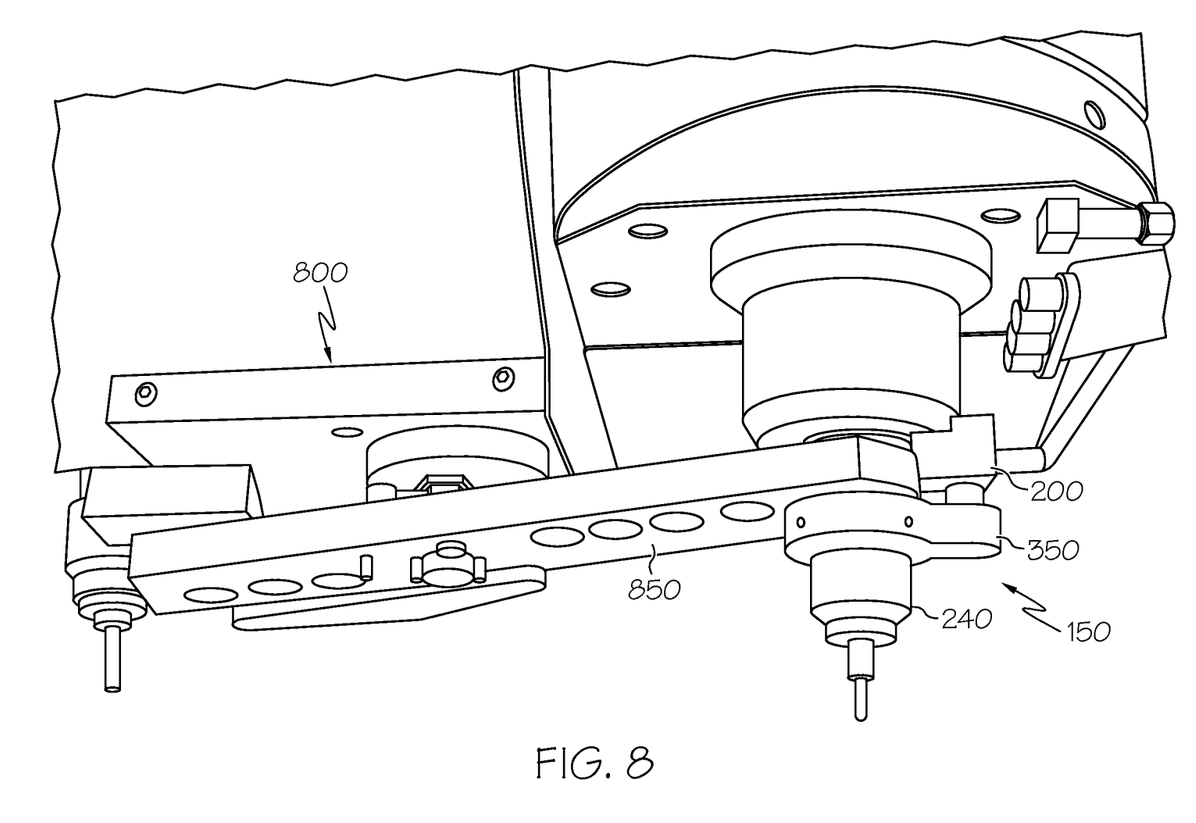
FIG. 8 is a perspective view of a portion of the system of FIG. 1 with the auto tool changer.
Figure 9:
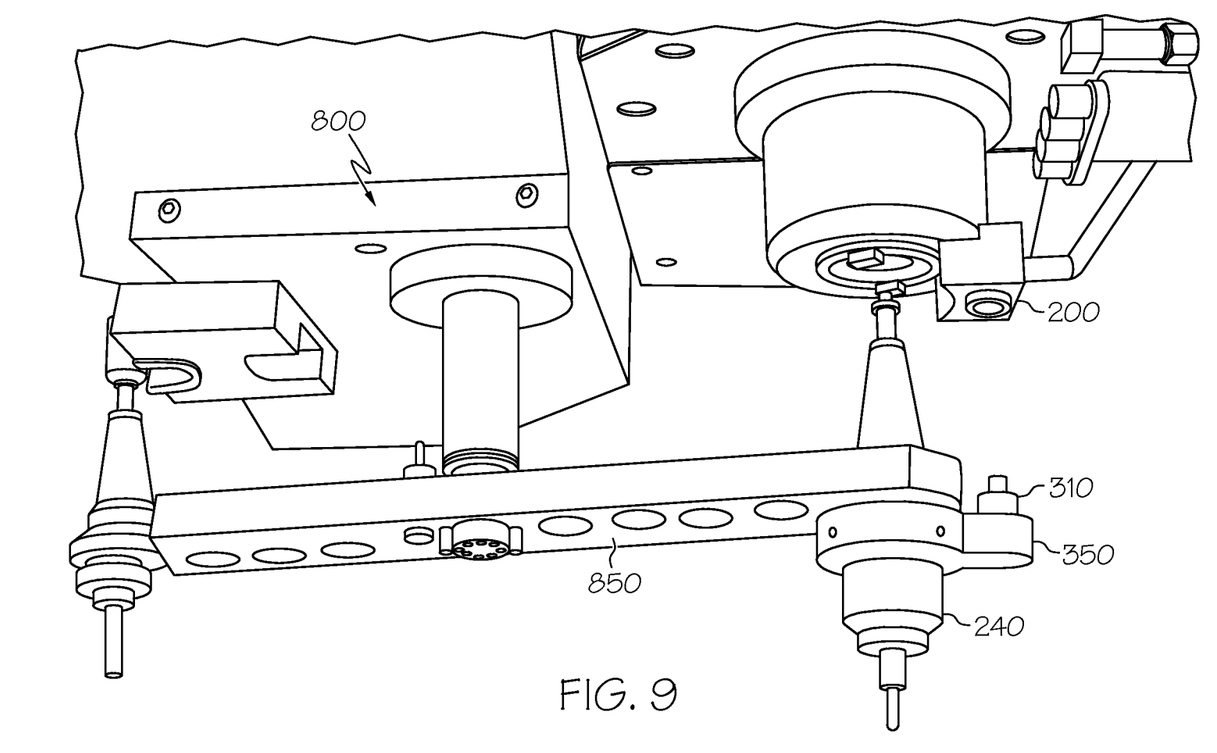
FIG. 9 is another perspective view of the portion of the system of FIG. 1 with the auto tool changer.

Referring additionally to FIGS. 8-9, the mounting collar 350 can be selectively coupled to the mounting block 200 by the auto change device 800, where the mounting block 200 and mounting collar 350 in fluid communication in order to deliver air to the mounting opening 556. The spindle 240 can be rotated by way of the air delivered through the collar arm 670, such as rotation by 45 degrees, although other degrees of rotation are contemplated. The spindle 240 can also be powered by the air delivered through the collar arm 670, the mounting opening 556 and the collar supply passage 352 into the spindle air inlet (not shown). A spindle groove can be provided on the spindle housing to act as a guide for the rotation of the spindle. This is further describe with reference to U.S. patent application Ser. No. 12/201,711 filed on Aug. 29, 2008, which claim priority to U.S. Provisional Patent Application Ser. No. 60/969,294, filed Aug. 31, 2007, and commonly assigned herewith to Air Turbine Technologies, Inc., the disclosure of each application is hereby incorporated by reference in their entirety Referring to FIGS. 8-9, in operation, the auto changer arm 850 of auto changer device 800 can selectively engage with one of the spindles 142 that are held in the carousel 140. The spindles 142 can each have a mounting collar 350 connected thereto. The auto changer device 300 can move the spindle 240 from its position in the carousel 140 to a position near the CNC machine 104. The mounting collar 350 can be coupled to and placed in fluid communication with the mounting block 200 through use of the quick connect device (not shown) and the air inlet assembly 310 by the auto changer device 300. The USMA 150 can provide for rotation of the spindle 240 (e.g., by 45 degrees) to allow for connection with the CNC machine 104 and/or loading back into the carousel 140.

The USMA 150 allows for the use of various types of spindles 142 with the CNC machine 104 and the auto changer device 800. For example, the mounting collar assembly 250 can be coupled with spindles that are not specifically designed for use with the auto changer device 800. The air supply to the spindle 240 does not need to be through the plunger but rather can be done through use of collar arm 670.

Figure 10:
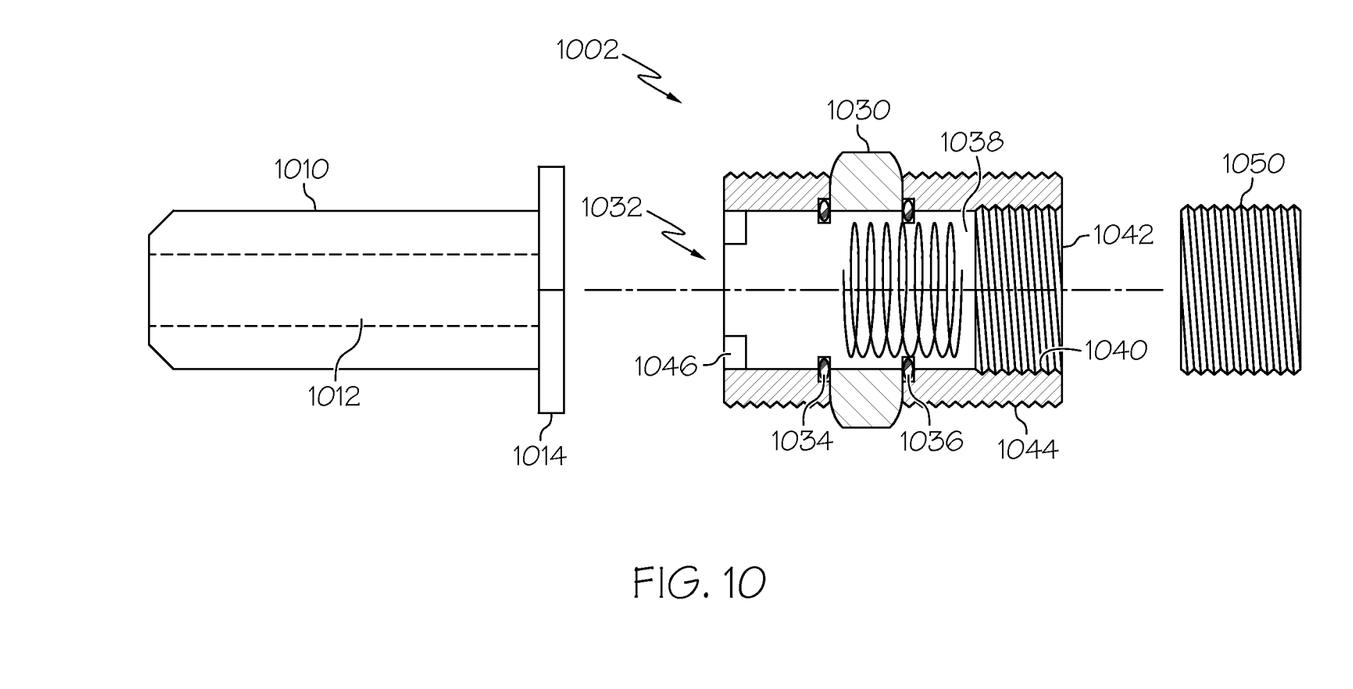
FIG. 10 is a side explosion view of a compliant air inlet assembly of FIGS. 3-10.

Referring now to FIG. 10 shown is a side explosion view of a compliant air inlet assembly 1002 to replace the air inlet assembly 310 of FIGS. 3-9. In this example, an air passage 1012 is formed within a piston 1010 with an annular lip 1014 formed on one end as shown. The piston is sized to fit inside an opening 1032 through base member 1030. External threads 1044 on the base member are adapted to engage an opening 564 in mounting collar 350

The base member includes a set of grooves and seals 1034, 1036, to form a tight seal around the piston 1010. A spring 1038 is used to urge the annular lip 1014 of the piston 1010 towards the stops 1046 disposed near the end of opening 1032. A threaded cap 1050 is sized to fit interior threads 1040 in the second end 1042 of the base 1030. In one example the distance into the base 1030 that the piston 1010 can travel is adjustable by the depth the threaded cap 1050 is inserted in the end 1042. This spring loaded piston arrangement provides compliance to the air inlet assembly 1002, which automatically adjusts for the height. This compliant air inlet assembly 1002 enables the quick disconnect air inlet 310 able to automatically adapt for different mounting spacing to mounting block 200.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Therefore, it is intended that the disclosure not be limited to the particular embodiment(s) disclosed as the best mode contemplated for carrying out this invention, but that the invention will include all embodiments falling within the scope of the appended claims.

What is claimed is:

1. An auto changer spindle mounting assembly for mounting a spindle to a machining system so that the spindle and mounting assembly can together be selectively exchanged by an automatic changer device, the mounting assembly comprising:
    a collar with a collar body and a collar arm, the collar body includes a first side and a second side, the collar body defines a collar opening therethrough to create a passage between the first side of the collar body and the second side of the collar body;
    a tubular collar sleeve with a side wall and a threaded opening through the side wall, the tubular collar sleeve with a first end formed with an outer diameter sized to be larger than the collar opening, and the tubular collar sleeve with a second end formed with an outer diameter sized to fit through the collar opening with a portion of the second end of the tubular collar sleeve protruding from the second side of the collar opening;
    a threaded plug sized to thread into the threaded opening;
    a lock ring formed with an inner diameter sized to fit around the second end of the tubular collar sleeve protruding from the second side of the collar opening; and
    a gas inlet;
    wherein the collar body defines a further passage in fluid communication between the gas inlet and the collar opening, wherein the further passage is configured so as to direct fluid so as to cause rotation of the spindle.

2. The auto changer spindle mounting assembly of claim 1, wherein the threaded plug is configured to hold the spindle inside the tubular collar sleeve.

3. The auto changer spindle mounting assembly of claim 2, wherein the gas inlet includes a check valve adapted to allow a gas to pass into the gas inlet above a given pressure.

4. The auto changer spindle mounting assembly of claim 1, wherein the collar opening is a circular collar opening, and wherein the lock ring includes at least one fastener for holding the lock ring to the second end of the tubular collar sleeve protruding from the second side of the collar opening.

5. The auto changer spindle mounting assembly of claim 1, wherein the collar opening is a circular collar opening with a side wall, the side wall including grooves formed thereon, and wherein the auto changer spindle mounting assembly further includes at least a first seal sized to fit between the tubular collar sleeve and one of the grooves, and wherein the auto changer spindle mounting assembly further includes at least a second seal sized to fit between the tubular collar sleeve and another of the grooves.

6. The auto changer spindle mounting assembly of claim 1, wherein the collar opening is a circular collar opening with a side wall, the side wall including a plurality of grooves formed thereon, and wherein the auto changer spindle mounting assembly further includes a first seal sized to fit in one of the plurality of grooves, and includes a second seal sized to fit in another of the plurality of grooves.

7. A machining system comprising:
    a spindle;
    a Computer-Numerically-Controlled (CNC) machine;
    an automatic changer device;
    an air supply line; and
    a mounting assembly for mounting the spindle to the Computer-Numerically-Controlled (CNC) machine so that the spindle and mounting assembly can together be selectively exchanged by the automatic changer device, the mounting assembly including
        a gas inlet;
        a collar with a collar body and a collar arm, the collar body includes a first side and a second side, the collar body defines a collar opening therethrough to create a passage between the first side of the collar body and the second side of the collar body, wherein the collar body defines a further passage in fluid communication between the gas inlet and the collar opening, wherein the further passage is configured so as to direct fluid so as to cause rotation of the spindle;
        a tubular collar sleeve with a side wall and a threaded opening through the side wall, the tubular collar sleeve with a first end formed with an outer diameter sized to be larger than the collar opening, and the tubular collar sleeve with a second end formed with an outer diameter sized to fit through the collar opening with a portion of the second end of the tubular collar sleeve protruding from the second side of the collar opening;
        a threaded plug sized to thread into the threaded opening; and
        a lock ring formed with an inner diameter sized to fit around the second end of the tubular collar sleeve protruding from the second side of the collar opening.

8. The system of claim 7, the system further comprising at least one mounting block that selectively connects with the collar.

9. The system of claim 8, wherein the gas inlet has a quick connect device that selectively connects with the at least one mounting block.

10. The system of claim 7, wherein the collar opening of the collar body includes two grooves defining a channel therebetween, and wherein the channel circumscribes the collar opening.

11. The system of claim 7, wherein the gas inlet has a quick connect device that connects with the air supply line.

* * * * *